(12) United States Patent
Dimovski et al.

(10) Patent No.: US 9,189,903 B2
(45) Date of Patent: Nov. 17, 2015

(54) EXTENDED USER ASSISTANCE

(75) Inventors: Dragan Dimovski, Lund (SE); Ann Ekstrom, Lund (SE); Emma Overgaard, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 51 days.

(21) Appl. No.: 13/504,254

(22) PCT Filed: May 25, 2011

(86) PCT No.: PCT/EP2011/058560
§ 371 (c)(1),
(2), (4) Date: Apr. 26, 2012

(87) PCT Pub. No.: WO2012/159673
PCT Pub. Date: Nov. 29, 2012

(65) Prior Publication Data
US 2014/0097935 A1   Apr. 10, 2014

(51) Int. Cl.
| | | |
|---|---|---|
| *G05B 19/00* | (2006.01) | |
| *G07C 9/00* | (2006.01) | |
| *H04M 1/725* | (2006.01) | |
| *H04B 5/00* | (2006.01) | |

(52) U.S. Cl.
CPC .......... *G07C 9/00111* (2013.01); *H04B 5/0056* (2013.01); *H04M 1/7253* (2013.01); *H04M 1/72569* (2013.01); H04M 2250/04 (2013.01)

(58) Field of Classification Search
USPC .............................. 340/5.61, 5.86, 10.1–10.6, 340/572.1–572.9; 704/270.1; 709/217
See application file for complete search history.

(56) References Cited

U.S. PATENT DOCUMENTS

| | | | |
|---|---|---|---|
| 6,249,226 B1 * | 6/2001 | Harrison et al. | 340/572.1 |
| 6,724,374 B1 * | 4/2004 | Lapstun et al. | 345/179 |
| 7,747,797 B2 * | 6/2010 | Abraham et al. | 710/62 |
| 2002/0022498 A1 * | 2/2002 | Hokao | 455/556 |
| 2003/0120745 A1 * | 6/2003 | Katagishi et al. | 709/217 |
| 2004/0002305 A1 * | 1/2004 | Byman-Kivivuori et al. | 455/41.2 |
| 2004/0100363 A1 * | 5/2004 | Lane et al. | 340/5.86 |
| 2004/0233040 A1 * | 11/2004 | Lane et al. | 340/5.86 |
| 2005/0233772 A1 * | 10/2005 | Edward McDonnell | 455/566 |
| 2006/0069814 A1 * | 3/2006 | Abraham et al. | 710/8 |

(Continued)

FOREIGN PATENT DOCUMENTS

WO    2008066989 A1    6/2008

OTHER PUBLICATIONS

International Search Report and Written Opinion dated Feb. 29, 2012 issued in corresponding PCT application No. PCT/EP2011/058560, 11 pages.

*Primary Examiner* — Paul Obiniyi
(74) *Attorney, Agent, or Firm* — Tucker Ellis LLP

(57) ABSTRACT

The invention relates to providing extended user assistance to the user of a portable electronic device. In particular, the invention relates to providing using assistance for a user of a portable electronic device, comprising a display and a Near Field Communication (NFC) circuit. The method comprises swiping the portable electronic device over an NFC tag comprising user assistance data, accessing user assistance information based on the user assistance data and displaying the user assistance information on the display. The application also relates to a method for providing context-based user assistance information and to a corresponding device.

14 Claims, 5 Drawing Sheets

(56) References Cited

U.S. PATENT DOCUMENTS

| | | |
|---|---|---|
| 2006/0095342 A1* | 5/2006 | Pilu et al. .................... 705/26 |
| 2006/0275064 A1* | 12/2006 | Minari ......................... 399/366 |
| 2006/0284859 A1* | 12/2006 | Lapstun et al. ............. 345/173 |
| 2007/0226151 A1* | 9/2007 | Baldischweiler et al. ...... 705/61 |
| 2008/0162141 A1* | 7/2008 | Lortz ......................... 704/270.1 |
| 2009/0231142 A1* | 9/2009 | Nikitin et al. ............. 340/572.8 |
| 2009/0312000 A1* | 12/2009 | Wakefield et al. ............ 455/418 |
| 2010/0101873 A1* | 4/2010 | Lapstun et al. ............ 178/18.09 |
| 2011/0028091 A1* | 2/2011 | Higgins et al. ............... 455/41.2 |
| 2011/0312272 A1* | 12/2011 | Goto et al. ................... 455/41.1 |

* cited by examiner

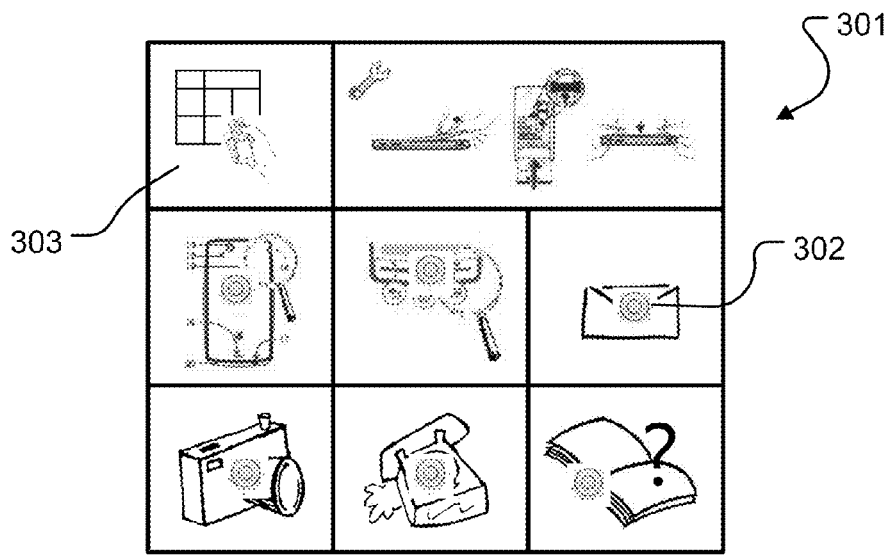
Fig. 3a
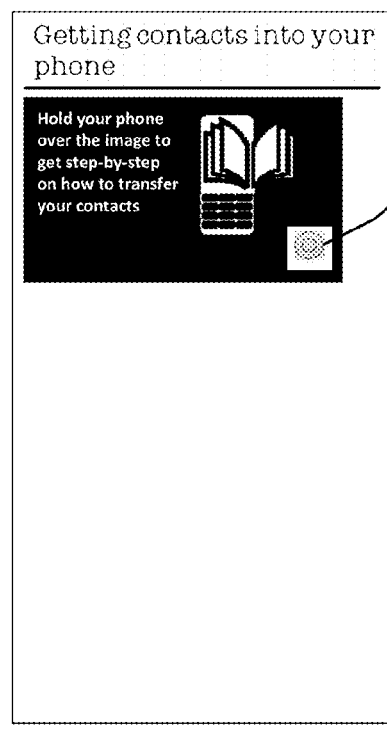
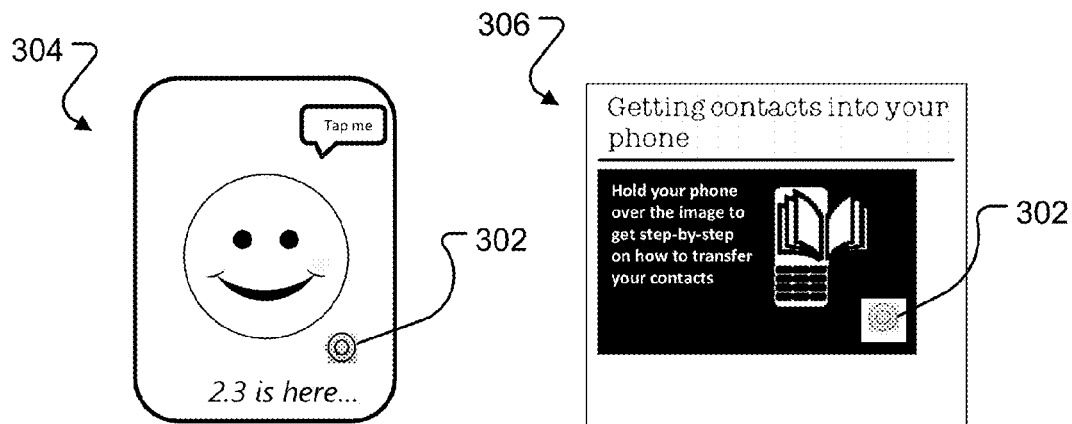
Fig. 3b
Fig. 3d
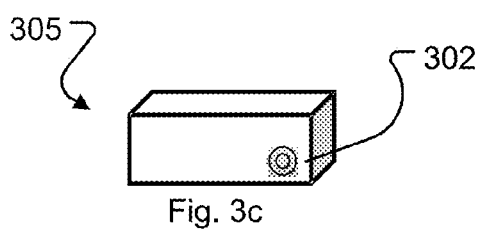
Fig. 3c

EXTENDED USER ASSISTANCE

TECHNICAL FIELD

The present invention relates to the field of user assistance, and to a method for retrieving user assistance when operating a portable electronic device. More particularly the present invention relates to a method for providing user assistance for portable electronic devices using NFC tags and for retrieving user assistance from those tags. The invention also relates to a portable electronic device adapted to acquire extended user assistance using NFC.

BACKGROUND

When buying portable electronic devices, such as mobile phones, the devices are normally delivered in a box comprising information and accessories. The box and its contents are often called "phone kit". A "phone kit" normally comprises a user guide, i.e. written information guiding the user to how to operate the portable electronic device. In cases where the same phone kit is shipped to different countries, several printed user guides in different languages, are included in the "phone kit".

However, reduction of printed material in the box is highly wanted for economic and environmental reasons. Costs for printing and reprint are often high.

Furthermore, providing a full printed guide is often time-critical, because the final draft of the user guide has to be ready several weeks before launch of a new product, in order to print a large number of copies for delivery with the products. Hence, a printed guide is often delivered without support for late updates. Therefore, a full printed user guide is not always included in the kit. Instead, the mobile phone may be delivered with shorter start-up guide.

Today, for most electronic devices, a full user guide is also available online using e.g. a desktop computer. Furthermore, portable electronic devices of today, often comprise large, high-quality displays. Hence, an online user guide may as well be retrieved and displayed using the portable electronic device.

However, it is not always easy to find the correct guide on the manufacturer's home page, due to the large number of electronic products released on the market today.

Furthermore, electronic devices of today are generally quite complex. Therefore, it may be difficult to find the right section in the online user guide, even if the right document has been found.

Hence, today there does not exist any flexible and cost efficient way of providing intuitive user assistance to users of portable electronic devices. Therefore, a method for extended user assistance, which overcomes any of the above mentioned problems, would be welcome.

SUMMARY OF THE INVENTION

With the above description in mind, then, an aspect of the present invention, is to provide an improved way of delivering extended user assistance to the user of portable electronic devices. This is achieved by using Near Field Communication (NFC) tags placed in different places, to provide user assistance information to be displayed or played on the portable electronic device. The use of NFC tags allows for a simple, and possibly contextual, interaction between analogue (printed) support material and digital support material.

Near Field Communication (NFC) is a short-range wireless technology, typically operating at a distance of 4 cm or less. NFC is commonly known within the field of portable devices and will therefore not be further described in this application.

More specifically the invention relates to a portable electronic device comprising:
- a Near Field Communication (NFC) circuit adapted to retrieve data stored on an NFC tag,
- a controller adapted to identify the data as being context-based user assistance data and to retrieve current user context of the portable electronic device,
- access means adapted to access user assistance information based on the context-based user assistance data and the current user context and
- provision means adapted to provide user assistance information, corresponding to the current user context, to the user.

According to one aspect of the invention, it relates to a portable electronic device, further comprising:
- means for identifying a language in the portable electronic device and for providing the user assistance information based on the language. The user assistance information may be provided on a display, a speaker or using any other means.

According to another aspect of the invention, it relates to a portable electronic device, further comprising:
- an internal memory where the user assistance information is stored.

According to another aspect of the invention, it relates to a portable electronic device, wherein the context-based user assistance data comprises an address to an external data storage and wherein the access means is wireless communication means, adapted to retrieve the user assistance information from the external data storage.

According to another aspect of the invention, it relates to a portable electronic device, wherein the user context is an application and wherein the user assistance information is the user manual of the application.

According to another aspect of the invention, it relates to a portable electronic device, wherein the portable electronic device is a mobile phone.

The invention also relates to a method for providing using assistance to a user of a portable electronic device, comprising an Near Field Communication (NFC) circuit, comprising the following steps:
- providing user assistance data on at least one NFC tag,
- swiping the portable electronic device over an NFC tag,
- retrieving user assistance data stored on the NFC tag,
- accessing user assistance information based on the user assistance data and
- providing user assistance based on the user assistance information corresponding to the current user context to the user.

According to another aspect of the invention, it relates to a method for providing using assistance, further comprising the step of identifying a language in the portable electronic device and providing the user assistance information based on the language.

According to another aspect of the invention, it relates to a method for providing using assistance, wherein the step of accessing user assistance information comprises accessing data from an internal memory in the portable electronic device.

According to another aspect of the invention, it relates to a method for providing using assistance, wherein the user assistance data comprises an address to an external data storage and wherein the step of accessing user assistance information comprises retrieving data from the external data storage.

According to another aspect of the invention, it relates to a method for providing using assistance, wherein at least one NFC tag is placed on a phone box.

According to another aspect of the invention, it relates to method for providing using assistance, wherein at least one NFC tag is placed in a printed document.

According to another aspect of the invention, it relates to method for providing using assistance, wherein at least one NFC tag is placed on a "Quick guide", wherein each NFC tag is represented by an image.

According to another aspect of the invention, it relates to a method for providing using assistance further comprising the step of:

retrieving the user context currently used by a user of the portable electronic device, wherein the step of accessing user assistance information based on the user assistance data further comprises accessing user assistance information based on the current user context.

The invention also relates to a computer program including programmed instructions that when executed on a computer causes the computer to perform the method for providing using assistance to a user of a portable electronic device.

The invention provides for simple and possibly contextual interaction between analogue printed support material and digital support material. This could solve many of the problems of today.

One effect of one aspect of the invention is that a unified "phone kit" may be used in countries having different official languages, because user assistance information is provided on an NFC tag. Different NFC tags may be used in different countries, wherein the tag may e.g. be glued onto the phone box.

One effect of one aspect of the invention is that the costs may be saved by reducing printed material in "phone kits" today containing e.g. 8 identical printed guides in different languages. These may be replaced with one or more NFC tags. Thereby, also weight and thus shipping costs are reduced.

One effect of one aspect of the invention is that smaller boxes could be used, when a printed full user guide is replaced by a NFC tag.

One effect of one aspect of the invention is that an image based user guide is used, which does not need to be localised. Hence, translation costs are saved.

One effect of one aspect of the invention is that the latest version of the user guide is always provided, because the extended user assistance is provided from an external data storage, which may be continuously updated.

One effect of one aspect of the invention is that the number of calls to "call centres" may be reduced if relevant and immediate user assistance is provided.

One effect of one aspect of the invention is that more users may update their mobile phones to a more stable release, if a user guide for updating the phone software is available, e.g. in a newspaper, and easy to use. This may improve customer satisfaction and user experience. A software upgrade may even be enough to avoid a user returning his/her mobile phone

BRIEF DESCRIPTION OF THE DRAWINGS

The present invention will be more readily understood, through the study of the following detailed description of the embodiments/aspects together with the accompanying drawings, of which:

FIG. 3a to 3d shows examples of how to use NFC tags comprising extended user assistance.

It should be added, that the following description of the embodiments is for illustration purposes only and should not be interpreted as limiting the invention exclusively to these embodiments/aspects.

DETAILED DESCRIPTION

The examples presented relate in general to mobile phones. However, it should be appreciated, that the invention is as such equally applicable to any portable electronic device where user assistance is provided to the user.

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference signs refer to like elements throughout.

Figure 1A:
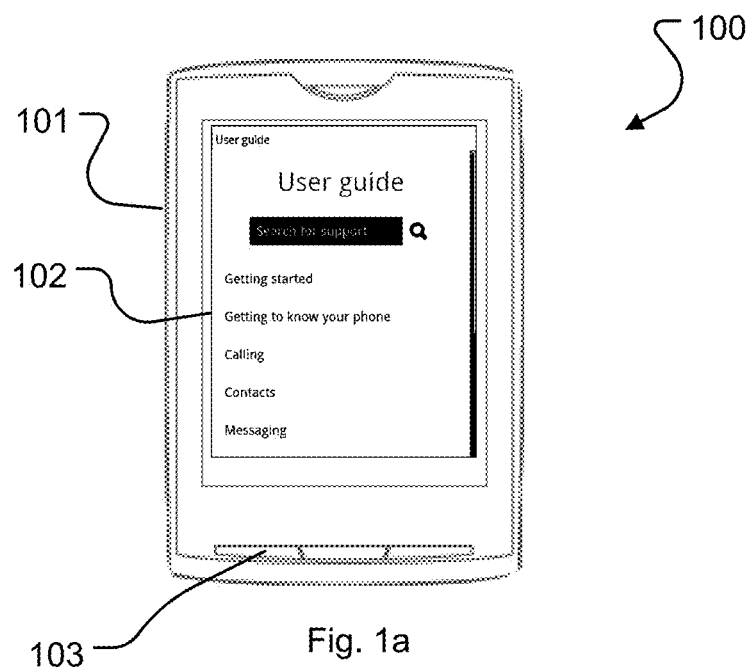
FIGS. 1a and 1b shows a portable communication device adapted to retrieve extended user assistance.
Figure 1B:
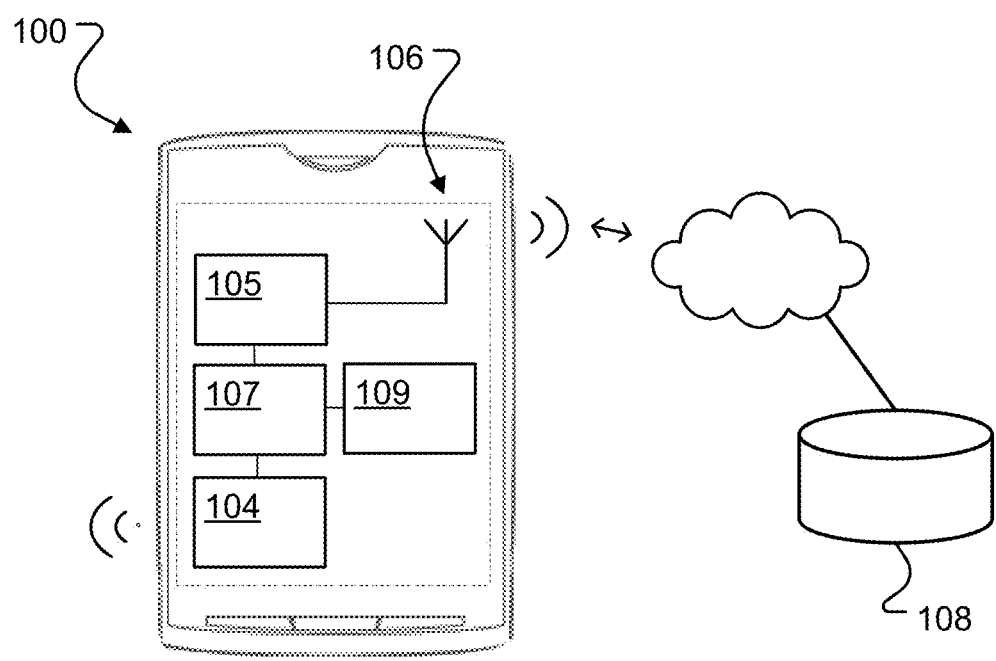

FIGS. 1a and 1b shows a mobile phone adapted to retrieve extended user assistance.

FIG. 1a shows the mobile phone seen from the front. The mobile phone 100, comprises a casing 101, a display area 102 e.g. a touch screen and additional means 103 for navigating among items displayed in the display area.

FIG. 1b illustrates the components of a mobile phone 100 for acquiring extended user assistance. The mobile phone 100 comprises an NFC circuit 104, a mobile communication transceiver 105, an antenna module 106, a controller 107 and a memory device 109.

The NFC circuit 104 is adapted to communicate with an external NFC device, such as an NFC tag.

The mobile communication transceiver 105 e.g. a CDMA transceiver, is adapted to communicate with a mobile communications network via the antenna module 106. The mobile communication transceiver 105 is adapted to access information, e.g. based on data retrieved from an NFC tag, from an external data storage 108. The data could e.g. be an internet address.

The controller 107 may be any processing means adapted to control the operation of the mobile phone, e.g. when acquiring extended user assistance.

The mobile phone 100 may also comprise other elements normally present in such a device, such as cameras, speakers, a microphone, a photo sensor (e.g. ambient light), a infrared light (IR) sensor, infrared light emitting diode (IR LED), further processing means, memory means, one or more accelerometers, a vibration device, an AM/FM radio transmitter and receiver, a Bluetooth chip, etc.

Figure 2:
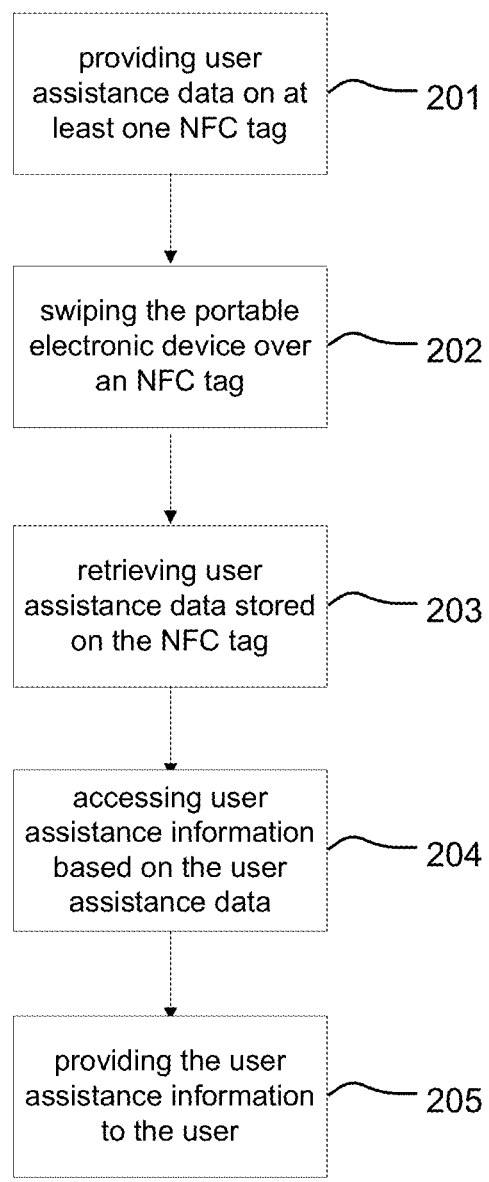
FIG. 2 illustrates the method for acquiring extended user assistance in a flow chart.

FIG. 2 illustrates the method for acquiring user assistance data in a flow chart.

The invention is based on the idea that user assistance data is initially provided on at least one NFC tag, step 201. In this application "user assistance data" refers to any kind of data that can be used to access user assistance information e.g. an internal memory address, a link to an external data storage or if suitable the information itself. NFC tags comprising user assistance data may be placed on several different places, accessible for the user in different situations. Examples on how to place the tags, are shown in FIGS. 3a to 3d.

When retrieving the user assistance data, the mobile phone 100 is first swiped over the NFC tag, step 202. When the mobile phone 100 is swiped over an NFC tag e.g. a NFC tag comprising user assistance data, the NFC circuit 104 retrieves data, in this case user assistance data, stored on the NFC tag, step 203. The user assistance data may e.g. be an address of an external data storage 108, e.g. an internet address, where the user assistance information is stored. The user assistance information may also be stored within the mobile phone, e.g. in an internal memory device 109 such as a memory card.

The mobile phone 100 then accesses the user assistance information based on the user assistance data, step 204. This may be done by using the mobile communication transceiver 105 for connecting the mobile phone 100 to the internet and thereafter reading data from the internet address provided on the tag. The user assistance information may be accessed using different communication means such as e.g. WLAN, USB or Bluetooth. It may also be done by reading an internal memory device 109.

Finally, the retrieved user assistance information is provided to the user e.g. by showing it on the display 102 of the mobile phone 100, step 205. The user assistance may also be played on a speaker or provided in any other way. According to one aspect of the invention the user assistance may be provided by guiding the user to a particular link where e.g. new software can be downloaded.

FIG. 3a-d shows how NFC tags comprising user assistance data may be used. By placing NFC tags on different places user assistance data may be provided to a user in different situations.

FIG. 3a shows an image-based "Quick guide" 301. The "Quick guide" 301 is typically placed in the phone box, when buying the phone. Hence, the user opens the box and finds an image-based "Quick guide" 301 with assembly instructions. An image 303 explains how the user should use the guide. Each functional area is represented by an image and an NFC tag 302. The user places the mobile phone 100 over the NFC tag 302 to read about the function in the mobile phone 100. The guide could also be a "Setup guide" or an "Inspiration guide".

As the "Quick guide" 301 does not comprise any text, the same guide can be used in any country independent on language. Hence, the "Quick guide" 301 could be used in a unified "phone kit", i.e a "phone kit" used for several countries.

FIG. 3b shows and advertising sticker 304 that may e.g. be placed in a newspaper, e.g. in an advertising. The advertising sticker 304 may e.g. comprise information that a new Software release is available. The Tag may comprise user assistance data guiding the user to how to update the Software. An NFC tag 302 is positioned on the advertising sticker 304. The NFC tag 302 may even be a link directly to a source where the new software can be downloaded. Thereby, providing for automatic downloading.

FIG. 3c discloses an NFC tag 302 placed on the phone box 305. The NFC tag 302 may as well be placed inside the phone box 305. When the user swipes the mobile phone 100 over the NFC tag 302, a localized full user guide and/or legal text is then opened in the mobile phone 100. Thereby, a unified "phone kit" may be used for different countries, wherein the language is defined by the NFC tag 302 or by reading data from the mobile phone 100. Hence, a manual in the correct language may e.g. be provided by using different tags comprising different addresses may be used in different countries.

The language may also be defined by reading out data from the mobile phone 100, e.g. the UI language or the language of the SIM card. Thereby, different alternatives may be automatically chosen or presented to the user as different options.

FIG. 3d discloses an NFC tag 302 integrated in the printed guide 306. A NFC tag 302 may be integrated in a printed guide in order to explain complicated things, e.g. transferring contacts is a problem for all Android manufacturers. To provide a NFC tag 302 in the printed guide is an easy way to direct the user to online help, e.g. "SEMC Transferring contacts" web page. Other examples of complicated areas are setting up accounts, e.g. email or synchronisation.

To retrieve the extended user assistance, the user e.g. opens the box and finds a "Startup guide", i.e. a very simple user guide. If the user doesn't understand how to get his contacts downloaded into the new mobile phone 100, which may quite complicated to understand. Then, the user finds a heading and image that encourages her/him to hold the mobile phone 100 over the image to get step-by-step on how to transfer his contacts. The page comprises an NFC Tag 302 linking to the corresponding page in the full online user guide. Thereby, the user is not put off by the large amount of text required to explain a complicated area.

Figure 4A:
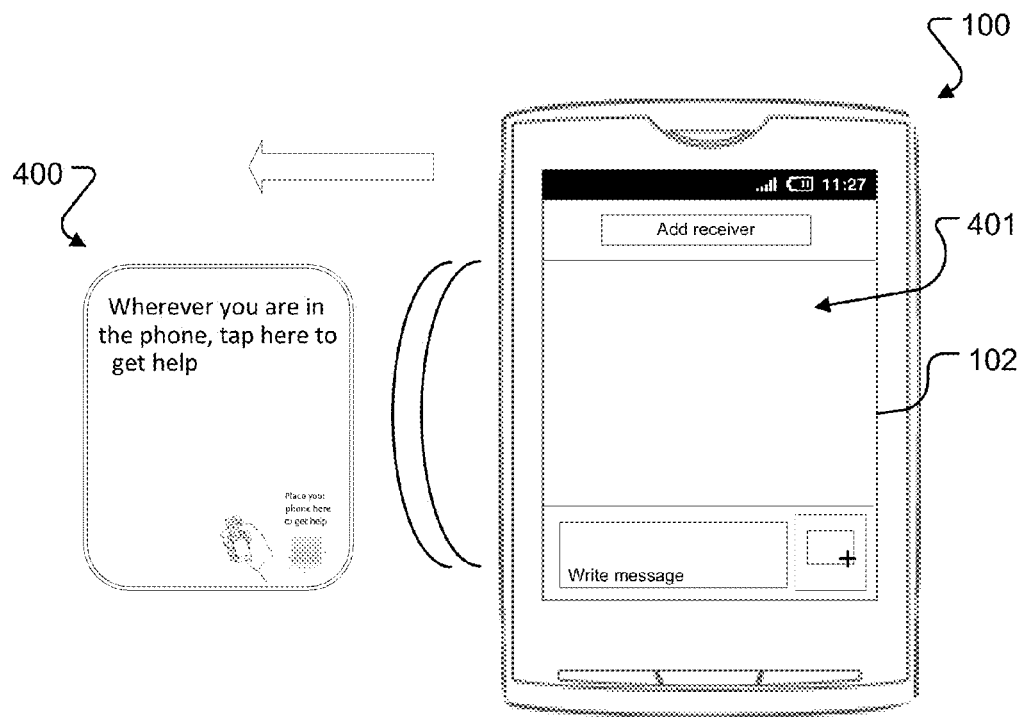
FIG. 4 shows a mobile phone retrieving context-based user assistance.
Figure 4B:
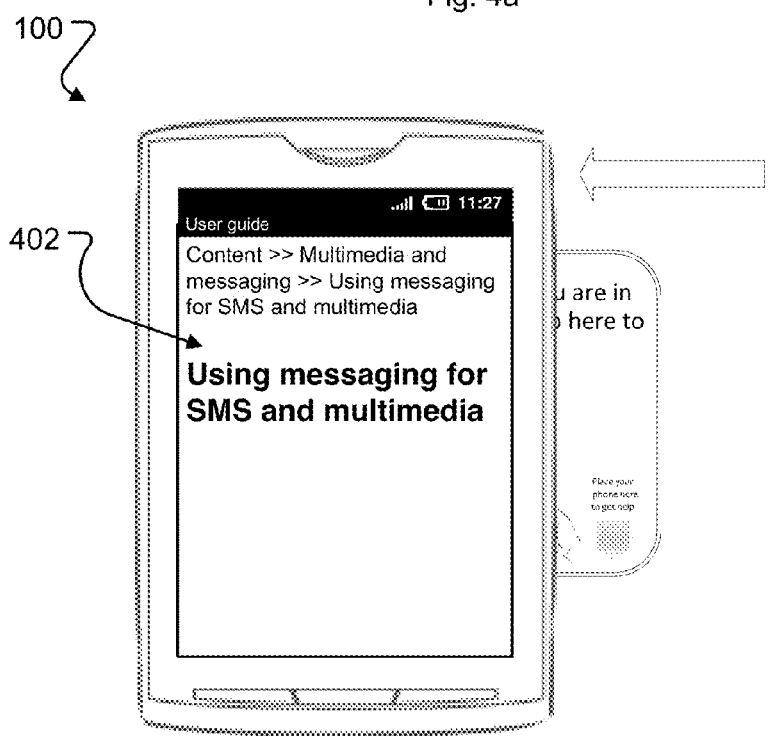

NFC tags may also be used in order to provide context-based user assistance. FIGS. 4a and 4b shows a mobile phone 100 retrieving context-based user assistance.

In FIG. 4a, a mobile phone 100 is swiped over an NFC tag 450. The NFC tag 400 may be placed on a card which is provided in the phone box stating e.g. "wherever you are in the phone tap here to get help". The idea is that when a user gets "stuck" when using his mobile phone, then he may swipe the card and the mobile phone will provide user assistance about the current user context.

The mobile phone 100 comprises the same parts as described in FIG. 1. However, the mobile phone 100, is further adapted to provide user context-based user assistance.

Hence, the controller 107 of the mobile phone 100 is further adapted to identify user assistance data or information, as being context-based user assistance data. The controller 107 of mobile phone 100 is also adapted to retrieve the user context currently used by a user of the portable electronic device. The user context refers to the context or contexts the mobile phone 100 is currently used in. The user context may be the current UI context or an application running on the mobile phone 100. In FIG. 4a the current UI context 401 displayed on the display 102 is the messaging UI for sending a message e.g. SMS.

Hence, the phone 100 comprises means for accessing user assistance information based on the context-based user assistance data and the current user context. The NFC tag 400 may e.g. provide information about which user guide to access. The mobile phone 100 may then provide information about which section or page of the user guide to display. The identification of the user context may be on different levels. It may provide user assistance information about a specific application e.g. the phonebook. It may also provide user assistance information about a specific feature e.g. adding a contact in the phonebook.

The phone 100 is further adapted to display the user assistance information 402 corresponding to the current user context on the display. This may be done automatically when swiping the tag. In FIG. 4b, the mobile phone 100 displays the user guide 402 relating to the current UI context 401 i.e. "sending an SMS" on the display.

Figure 5:
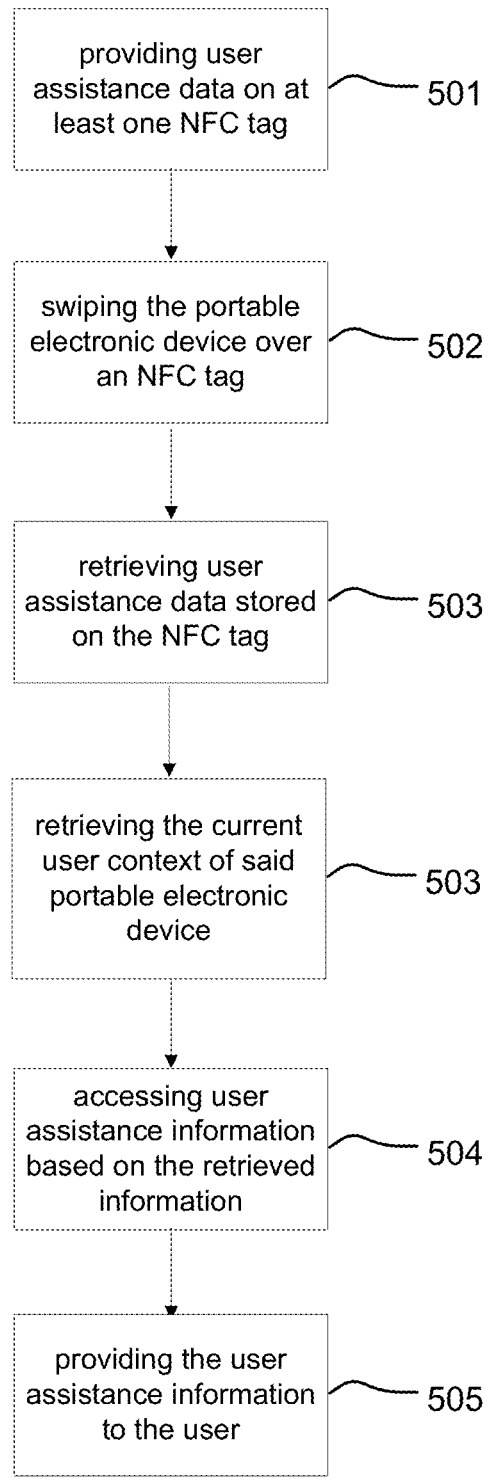
FIG. 5 illustrates the method for retrieving context-based extended user assistance in a flow chart.

FIG. 5 illustrates the method for acquiring context-based user assistance data in a flow chart.

As described above, the user assistance data is initially provided on at least one NFC tag, e.g. a card placed in the "phone kit", step 501. This type of cards may also be placed in other places, such as in public places.

When retrieving context-based user assistance in a mobile phone 100, the idea is that the user uses the phone in desired way. In this example, the user has opened the messaging application for sending an SMS. When the user gets stuck, he initializes the display, or other way of providing, user assistance by swiping the mobile phone 100 over the NFC tag, step 502. When the mobile phone 100 is swiped over an NFC tag e.g. a NFC tag comprising user assistance data, the NFC circuit retrieves user assistance data stored on the NFC tag, step 503. The user assistance data may e.g. be an address of an external data storage 108, e.g. an internet address. The user assistance information may also be stored within the mobile phone 100, e.g. on an internal memory card 109. The mobile phone identifies the user assistance data as being context-based user information data. Then, the mobile phone 100 retrieves information about the current user context.

The mobile phone 100 then accesses the user assistance information based on the user assistance data and the current user context, step 504. This may be done by using the mobile communication transceiver 105 for connecting the mobile phone 100 to the internet and thereafter reading data from the internet address provided on the tag. The user assistance information may be accessed using different communication means such as e.g. WLAN, USB or Bluetooth. It may also be done by reading an internal memory device 109.

Finally, the retrieved user assistance information is provided to the user, e.g. on the display 102, step 505. The user assistance information may also be played or provided in any other way.

According to one aspect of the invention different NFC tags may be provided for different languages. Hence, the user may access the desired user guide by swiping the correct tag. This may be done by providing a sticker on the phone box. The phone box may comprise several NFC tags and thereby support different languages. Hence, one single NFC tag can be used as the behaviour is context triggered. Hence, the relevant help is depending on what part of the phone the user is exploring.

The invention is not limited to the embodiment described above, but may be modified without departing from the scope of the claims below.

The terminology used herein is provided for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The foregoing has described the principles, preferred embodiments and modes of operation of the present invention. However, the invention should be regarded as illustrative rather than restrictive, and not as being limited to the particular embodiments discussed above. The different features of the various embodiments of the invention can be combined in other combinations than those explicitly described. It should therefore be appreciated that variations may be made in those embodiments by those skilled in the art without departing from the scope of the present invention as defined by the following claims.

The invention claimed is:

1. A portable electronic device comprising:
   a Near Field Communication (NFC) circuit adapted to retrieve data stored on an NFC tag, and
   a controller adapted to identify the data as being context-based user assistance data,
   wherein the controller is further adapted to:
      identify a first user context of the portable electronic device, wherein the first user context comprises a UI context displayed on a display of the portable electronic device at the time when the portable electronic device retrieves the data stored on the NFC tag, and
   access means adapted to access at least one element of user assistance information based on the identified first user context and the context-based user assistance data, and
   provision means adapted to provide the at least one element of user assistance information, corresponding to the identified first user context, to the user, and
   wherein the controller is further adapted to:
      identify a second user context of the portable electronic device that is different than the first user context, wherein the second user context comprises an application running on the portable electronic device at the time when the portable electronic device retrieves the data stored on the NFC tag,
      wherein the access means is further adapted to access a second element of user assistance information based on the identified second user context and the context-based user assistance data, wherein the second element of user assistance information is different than the first element of user assistance information, and
      wherein the provision means is further adapted to provide the second element of user assistance information, corresponding to the identified second user context, to the user.

2. The portable electronic device of claim 1, further comprising:
   means for identifying a language in the portable electronic device and for providing the user assistance information based on the language.

3. The portable electronic device of claim 1, further comprising:
   an internal memory for storing the user assistance information.

4. The portable electronic device of claim 1, wherein the context-based user assistance data comprises an address to an external data storage and wherein the access means is a wireless communication means, adapted to retrieve the user assistance information from the external data storage.

5. The portable electronic device of claim 1, wherein the at least one element of user assistance information corresponding to the second user context is a user manual of the application.

6. The portable electronic device of claim 1, wherein the portable electronic device is a mobile phone.

7. A method for providing user assistance to a user of a portable electronic device, comprising a Near Field Communication (NFC) circuit, comprising:
   providing user assistance data on at least one NFC tag,
   swiping the portable electronic device over the NFC tag,
   retrieving context-based user assistance data stored on the NFC tag,
   identifying a first user context of the portable electronic device, wherein the first user context comprises a UI context displayed on a display of the portable electronic device at the time when the portable electronic device retrieves the data stored on the NFC tag, accessing a first item of user assistance information based on the identified first user context and the context-based user assistance data, providing the first item of user assistance information corresponding to the identified first user context to the user, identifying a second user context of the portable electronic device that is different than the first user context, wherein the second user context comprises an application running on the portable electronic device at the time when the portable electronic device retrieves the data on the NFC tag, accessing a second item of user assistance information based on the identified second user context and the context-based user assistance data, wherein the second item of user assistance information is different than the first item of user assistance information, and providing the second item of user assistance information corresponding to the identified second user context to the user.

8. The method for providing user assistance of claim 7, further comprising:

identifying a language in the portable electronic device, and providing the first item of user assistance information based on the language.

9. The method for providing user assistance of claim 7, wherein accessing the first item of user assistance information comprises accessing data from an internal memory in the portable electronic device.

10. The method for providing user assistance of claim 7, wherein the user assistance data comprises an address to an external data storage, and wherein accessing the first item of user assistance information comprises retrieving data from the external data storage.

11. The method for providing user assistance of claim 7, wherein at least one NFC tag is placed on a box comprising the portable electronic device.

12. The method for providing user assistance of claim 7, wherein at least one NFC tag is placed in a printed document.

13. The method for providing user assistance of claim 12, wherein the printed document is a "Quick guide", and wherein each NFC tag is represented by an image.

14. A non-transitory computer-readable medium including programmed instructions to be executed by a processor forming part of a portable electronic device that, when executed by the processor, cause the processor to:

determine that the portable electronic device has been moved into proximity with at least one NFC tag, wherein the at least one NFC tag includes context-based user assistance data stored thereon;

retrieve the context-based user assistance data stored on the NFC tag, identify a first user context of the portable electronic device, wherein the first user context comprises a UI displayed on a display of the portable electronic device at the time when the portable electronic device retrieves the user assistance data stored on the NFC tag, access a first item of user assistance information based on the identified first user context and the context-based user assistance data, provide the first item of user assistance information corresponding to the identified first user context to the user, identify a second user context of the portable electronic device that is different than the first user context, wherein the second user context comprises an application running on the portable electronic device at the time when the portable electronic device retrieves the data on the NFC tag, access a second item of user assistance information based on the identified second user context and the context-based user assistance data, wherein the second item of user assistance information is different than the first item of user assistance information, and provide the second item of user assistance information corresponding to the identified second user context to the user.

* * * * *